(12) United States Patent
Doddi et al.

(10) Patent No.: US 12,380,047 B2
(45) Date of Patent: Aug. 5, 2025

(54) EXPANDED DATA LINK WIDTH FOR MAIN BAND CHIP MODULE CONNECTION IN ALTERNATE MODES

(71) Applicant: QUALCOMM Incorporated, San Diego, CA (US)

(72) Inventors: Ravindranath Doddi, Hyderabad (IN); Umamaheshwaran V, Salem (IN); Afreen Haider, Muzaffarpur (IN); Lekhya Pavani Godavarthi, Hyderabad (IN); Harinatha Reddy Ramireddy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 18/352,600

(22) Filed: Jul. 14, 2023

(65) Prior Publication Data

US 2025/0021504 A1    Jan. 16, 2025

(51) Int. Cl.
  *G06F 13/40* (2006.01)
  *G06F 13/42* (2006.01)

(52) U.S. Cl.
  CPC .......... *G06F 13/4018* (2013.01); *G06F 13/42* (2013.01)

(58) Field of Classification Search
  CPC ............................ G06F 13/4018; G06F 13/42
  USPC .......................................................... 710/307
  See application file for complete search history.

(56) References Cited

U.S. PATENT DOCUMENTS

| | | | | |
|---|---|---|---|---|
| 3,420,958 A | * | 1/1969 | Ewin .................... | H04Q 3/0004 379/334 |
| 4,656,610 A | * | 4/1987 | Yoshida ................. | G11C 29/83 714/6.32 |
| 4,878,166 A | * | 10/1989 | Johnson ................. | G06F 13/28 710/307 |
| 5,134,583 A | * | 7/1992 | Matsuo .................. | G11C 29/78 365/230.03 |
| 5,299,202 A | * | 3/1994 | Vaillancourt .......... | G11C 29/20 714/42 |

(Continued)

OTHER PUBLICATIONS

"Universal Chiplet Interconnect Express (UCIe)", Specification Revision 1.0, Feb. 24, 2022, 10 Pages, Sections (3.1.1.3, 3.2, 3.2.3, 3.2.4, 3.3 and 3.4).

(Continued)

*Primary Examiner* — Paul R. Myers
(74) *Attorney, Agent, or Firm* — Loza & Loza, LLP/Qualcomm

(57) ABSTRACT

Aspects relate to an expanded data link width for a chip connection. In one example a sideband transmitter of a module of a first die is configured to send an expanded data link width enable request to a module partner through a sideband to set an expanded data link width of a main band of the die-to-die connection. The expanded data link width includes data lines of the main band and redundant data lines of the main band reconfigured as data lines. A sideband receiver of the module is configured to receive an expanded data link width enable response from the module partner through the sideband to set the expanded data link width of the main band. A main band transmitter is configured to communicate data with the module partner through the main band using the expanded data link width.

25 Claims, 9 Drawing Sheets

(56) References Cited

U.S. PATENT DOCUMENTS

| | | | | |
|---|---|---|---|---|
| 5,359,561 | A * | 10/1994 | Sakomura | G11C 29/24 365/201 |
| 5,392,246 | A * | 2/1995 | Akiyama | G11C 29/24 714/711 |
| 5,801,554 | A * | 9/1998 | Momma | G11C 7/1084 365/189.05 |
| 6,295,236 | B1 * | 9/2001 | Brox | G11C 29/70 365/51 |
| 6,674,720 | B1 * | 1/2004 | Passint | H04L 47/10 370/235 |
| 8,793,411 | B1 * | 7/2014 | Balkan | G06F 13/4027 710/72 |
| 2002/0178315 | A1 * | 11/2002 | Rogers | G06F 13/4018 710/300 |
| 2003/0067816 | A1 * | 4/2003 | Anand | G11C 29/848 365/200 |
| 2007/0180179 | A1 * | 8/2007 | Irisa | G06F 13/364 710/307 |
| 2015/0370753 | A1 | 12/2015 | Wagh et al. | |
| 2019/0073324 | A1 * | 3/2019 | Ringe | G06F 13/1678 |
| 2020/0226084 | A1 | 7/2020 | Das Sharma | |
| 2022/0342840 | A1 | 10/2022 | Das Sharma et al. | |

OTHER PUBLICATIONS

Haffner B., et al., "PCI Express Base Specification Revision 4.0 Version 0.3", PCI-SIG Spexification, Feb. 19, 2014, pp. 1-1053, XP055595828, p. 287-p. 301.

International Search Report and Written Opinion—PCT/US2024/032434—ISA/EPO—Aug. 28, 2024.

* cited by examiner

EXPANDED DATA LINK WIDTH FOR MAIN BAND CHIP MODULE CONNECTION IN ALTERNATE MODES

TECHNICAL FIELD

Aspects of the present disclosure relate generally to data communication between integrated circuit chip modules and, in particular, to operation in an alternate data transfer mode using an expanded data link width.

BACKGROUND

As integrated circuit (IC) chips grow smaller, it has become possible to package multiple chips into a single package. Each chip may be optimized for the cost, materials, fabrication process, and size that is best suited for a particular function. In such a package, a central processor may be fabricated separately from a graphics processor, a special purpose processor, a volatile memory, a non-volatile memory, an input/output controller, or other components. Different components may be packaged together to meet different needs without redesigning any of the individual components. By placing these disparate chips into a single package, the total system that includes the package may be made smaller. Similar principles apply to printed circuit board systems and subsystems. In addition, the connections between the disparate chips may be faster at less cost. In some cases, the smaller chips e.g., a memory, special purpose processor, or an interface are referred to as chiplets, however, any chip may be referred to as a chiplet.

The Universal Chiplet Interconnect express (UCIe) specification version 1.0 (UCIe 1.0) defines physical parameters and protocols for data transfer between a chip and a chiplet or between two chiplets. The connection may be direct or through a package. The interconnect may be within a single package or across a circuit board between two different packages. UCIe 1.0 is intended to support interoperability between chiplets of different manufacturers and designers. The UCIe 1.0 interconnect includes a MainBand which is the primary data transfer connection and a SideBand which is the primary initialization and control connection. A sequence of state transitions is defined to take the interconnect from SideBand Initialization to MainBand Initialization to Link Initialization to an Active state and back to standby and reset states.

UCIe 1.0 defines a Standard Package and an Advanced Package. The Advanced Package version of UCIe 1.0 uses a MainBand with 64 data lanes, four redundant data lanes, two clock lanes, a track lane, a valid lane, a redundant clock lane and a redundant valid lane. The Advanced Package version is directed to a smaller bump pitch connector, e.g., 25-55 micrometers and shorter distances, e.g., less than 2 mm that might be found within a package. The Advanced Package also supports different data transfer modes through its MainBand data lanes with different size flow control units (FLITS) and different protocols. As examples, there is a raw mode, a streaming mode, a Peripheral Component Interconnect express (PCIe) 6 mode, and a variety of different Compute Express Link (CXL) modes. New versions, and modes may be developed over time.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example an apparatus includes a sideband transmitter of a module of a first die is configured to send an expanded data link width enable request to a module partner through a sideband of a die-to-die connection to set an expanded data link width of a main band of the die-to-die connection. The expanded data link width includes data lines of the main band and redundant data lines of the main band reconfigured as data lines. A sideband receiver of the module is configured to receive an expanded data link width enable response from the module partner through the sideband to set the expanded data link width of the main band. A main band transmitter is configured to communicate data with the module partner through the main band using the expanded data link width In one example a method includes sending an expanded data link width enable request to a module partner through a sideband of a die-to-die connection to set an expanded data link width of a main band of the die-to-die connection, wherein the expanded data link width includes data lines of the main band and redundant data lines of the main band reconfigured as data lines. An expanded data link width enable response is received from the module partner through the sideband to set the expanded data link width of the main band, and data is communicated with the module partner through the main band using the expanded data link width.

In another example a non-transitory computer-readable medium has instructions stored therein for causing a processor of an interconnect link to perform the operations of the method above.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
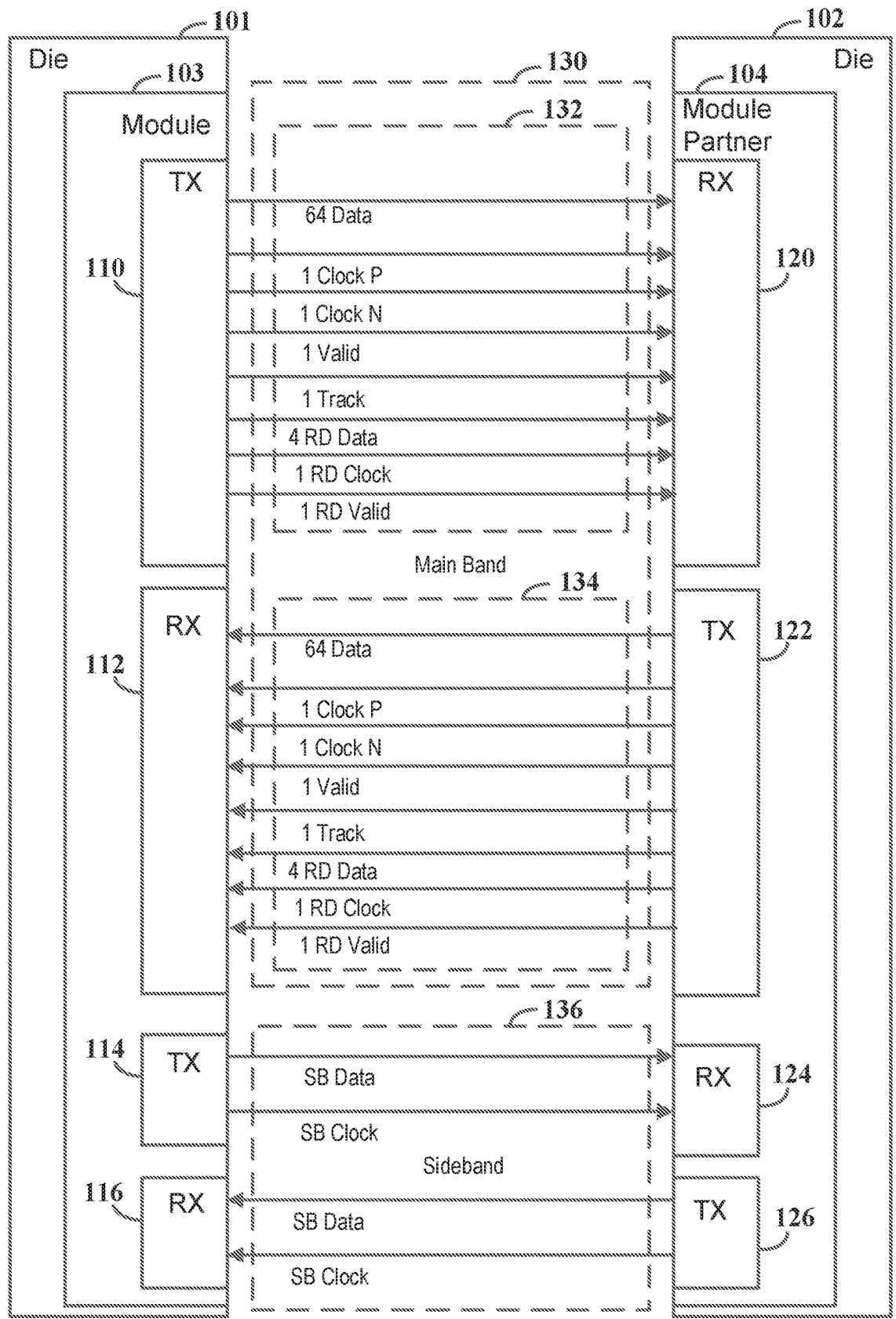
FIG. 1 is a block diagram of a module and a module partner coupled together with a 64 data lane die-to-die connection suitable for aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

A die-to-die connection herein can refer to a connection between any two dies, including a chip or a chiplet. A die may be considered to be any integrated circuit that is formed on and then cut, removed, or otherwise extracted from a wafer. The wafer may be silicon, glass, gallium nitride, or any other suitable material for forming integrated circuits. For the die-to-die connection, each die includes a module. In UCIe 1.0, a module includes a die-to-die adapter processor, PHY (physical) logic, and the PHY interface. The interface includes the transmitters and receivers for each line. A die may have multiple modules that may be coupled to modules of different dies or to the same die. While examples are presented in the context of UCIe 1.0, this interface specification is not required. The die-to-die connections described herein may also be used to connect two packages across a printed circuit board A die-to-die connection can offer a bidirectional main band with a high data rate by using multiple data lanes and multiple clock lanes. As used herein, each lane consists of a transmit line and a receive line. The lines are reciprocal in that a transmit line from the perspective of one module is a receive line from the perspective of the other module and vice versa. Stated another way one line is coupled to a transmitter of a module at one end and a receiver of a module at the other end.

A die-to-die connection has a fixed number of available data lanes that may be used to transfer bits from one end of the connection to the other. When the data lanes are used to support different protocols and different data transfer modes, a mismatch can arise between the physical data lanes of the die-to-die connection and the number of bytes of data in a FLIT of a chosen protocol and data transfer mode. As an example, PCIe is configured for 4, 8, 16, 32, 64, 128, or 256 data lanes. When properly configured a UCIe Advanced Package can transmit or receive 4 FLITS of 16 bytes each in one transfer using its 64 MainBand data lanes. Alternatively, four transfers may be used to transmit or receive a single 256-byte FLIT. CXL offers several different modes, but a primary mode has a 68-byte FLIT. With 64 data lanes, two transfers are used to transmit or receive one 68-byte FLIT. As an example, 64 bytes may be transferred in the first transfer and the remaining 4 bytes in the second transfer. These bytes may then be reassembled into 68-byte packets by the receiver. In the present description, MainBand and SideBand are used to refer to refer to the corresponding structures as defined in UCIe, while main band and sideband are used to refer generally to any die-to-die connection with bands as described herein.

As described herein, data lanes of a main band of a die-to-die connection are reconfigured from one data link width, e.g., 64 data lanes, to an expanded data link width, e.g., 68 data lanes, in order to accommodate a larger FLIT of an alternate data transfer mode, e.g., 68 bytes for CXL. The die-to-die connection may also be reconfigured to a reduced data link width, e.g., 64 lanes to accommodate a smaller FLIT, e.g., 64 bytes for PCIe. The data link width may be reconfigured by sending an expanded data link width enable request from a module to a module partner to set a data link width of the main band of the die-to-die connection. For a larger FLIT, e.g., a 68-byte CXL FLIT the expanded data link width may include the data lanes of the main band and the redundant data lanes of the main band, reconfigured as data lanes. Data is communicated with the module partner through the expanded data link width including the redundant data lanes.

By adding the four redundant data lanes to the 64 data lanes, a 68 data lane connection is obtained. The described approach may be applied to a UCIe MainBand interconnect using PCIe and CXL or to other main band interconnects between IC chip modules that have multiple data lanes and alternate modes. In the present description, a main band is configured using a sideband to exchange configuration parameters, e.g., in a main band initialization. This may be followed by training to configure the main band.

FIG. 1 is a block diagram of a first die 101 with a module 103 and second die 102 with a module partner 104 coupled together with a 64-lane die-to-die connection 100, e.g., a UCIe Advanced package interconnect, according to some aspects. The module 103 has a main band transmitter 110 that is connected to a transmit part 132 of a main band 130. Each die may have many other components (not shown) to generate, process, store, or communicate data or to supply or regulate power or perform operations, administration, or management functions, etc., depending on the nature of the die. The first die 101 has a module 103 and the second die 102 has a module partner 104. The module 103 and module partner 104 may have the same or a different structure and may include additional components (not shown) including transmitters, receivers, interfaces, adapters, logic, buffers, etc.

The connection is symmetrical in that the module 103 has a main band transmitter 110 and the module partner 104 has a main band transmitter 122. These two transmitters perform the same functions and operations in opposite directions using the same protocols. Similarly, the module 103 has a main band receiver 112 and the module partner 104 has a main band receiver 120. The present description is directed to the module and its construction and operation but the description applies equally to the module partner 104 in just the same way. Either side may initiate repair or training and either side may initiate parameter, and configuration changes, etc. The module 103 has a sideband transmitter 114 and a sideband receiver 116. The module partner 104 also has a sideband receiver 124 and transmitter 126.

UCIe 1.0 has a layered protocol with a physical layer and a die-to-die adapter. The physical layer can consist of all types of current packaging options from different fabricators and fabrication processes. Examples include 2D packaging, 2.5D packaging, 3D packaging and other approaches e.g., silicon-bridge, embedded multi-die interconnect bridge (EMIB), interposer-based chip-on-wafer-on-substrate (CoWoS), and fan-out chip on substrate (FOCoS) interposer packages, and any other connection between two dies on the same substrate or two packages on the same substrate. Optical or electrical connections may be made between packages to other components. UCIe may be expanded in future revisions to connect dies or packages across rack-based components.

The connection 100 has a main band 130 and a sideband 136. The main band has a transmit part 132 from the perspective of the module 103 and a receive part 134 from the perspective of the module 103. The 64 transmit data lanes each have a data line in the transmit part 132 and a data line in the receive part 134 for 64 lines in each direction. The sideband 136 also has a transmit part and a receive part each with a sideband data line and a sideband clock line.

The transmit part 132 includes 64 transmit data lines, a clock P line, a clock N line, a valid line, and a track line. The Advanced package main band transmit part 132 also includes 4 redundant data lines (RD Data) a redundant clock line (RD Clock), and a redundant valid line (RD Valid). The redundant lines are configured for use when one or more of the primary data or clock lines fail. The transmit part 132 is coupled to a main band receiver 120 of the module partner 104. The module 103 has a main band receiver 112 that is connected to a receive part 134 of the main band 130. The receive part 134 includes 64 receive data lines, a clock P line, a clock N line, a valid line, a track line, 4 redundant data lines, a redundant clock line, and a redundant valid line. The receive part 134 is coupled to a main band transmitter 122 of the module partner 104.

The redundant clock lane is provided as a bidirectional repair mechanism in case of a fault on one of the clock lanes. A fault on either one of the clock lanes, P, N, will lead to configuring the redundant clock lane to replace the faulty clock lane. The track lane may also be remapped as a clock lane if another of the clock lanes fails. Similarly, the redundant valid lane is provided as a bidirectional repair mechanism in case of a fault on the valid lane.

The 4 redundant data lines in each direction of the main band can be used in case a data line fails. Up to 4 data lines may fail in each direction without affecting the data throughput. However, a data line failure is highly unlikely in many implementations. If there are no data line errors, then the redundant data lines will always be in an IDLE state. As described below, by re-purposing the 4 main band redundant data lines and combining these lines with the existing 64 functional main band data lines, a 68-line data connection with an expanded data link width is created for main band data transmission. If there is a data line failure, then the configuration may revert to a different state in which fewer than all 68 data lines are required for a data transfer.

The particular numbers of lines are provided as examples in the context of UCIe 1.0 and different numbers of lines may be used to suit different die-to-die interconnections. There may be multiple expanded data link widths using different numbers of redundant data lines. There may be multiple reduced data link width using different numbers of data lines. There may be expanded data link widths in which one redundant data line is used to replace a failed data line and another redundant data line is used to expand the data link width.

The UCIe 1.0 protocol layer runs on top of the physical layer, and has many features in common with Peripheral Component Interconnect express (PCIe), Compute eXpress Link (CXL) and other pre-existing protocols. The PCIe protocol provides wide interoperability and flexibility. The CXL protocol provides low latency and high throughput connections. UCIe 1.0 may be expanded in future revisions to include other protocols and further modifications away from PCIe and CXL. The structures and methods presented herein are described in the context of UCIe 1.0, but may be adapted to future versions of UCIe under any name and other connection configurations with multiple clock lanes. PCIe has a multiple data transfer modes that are configured as multiples of 8. Accordingly, a FLIT in PCIe may be 8B, 16B, 32B, 64B, 128B, or 256B. The 64 data lanes correspond to a single 64B FLIT such that a single FLIT is fully transferred in one data transfer. For the other data transfer modes 8, 4, or 2 FLITs are transferred in one data transfer or 1, 2, or 4 data transfer are used to carry a single FLIT.

Figure 2:
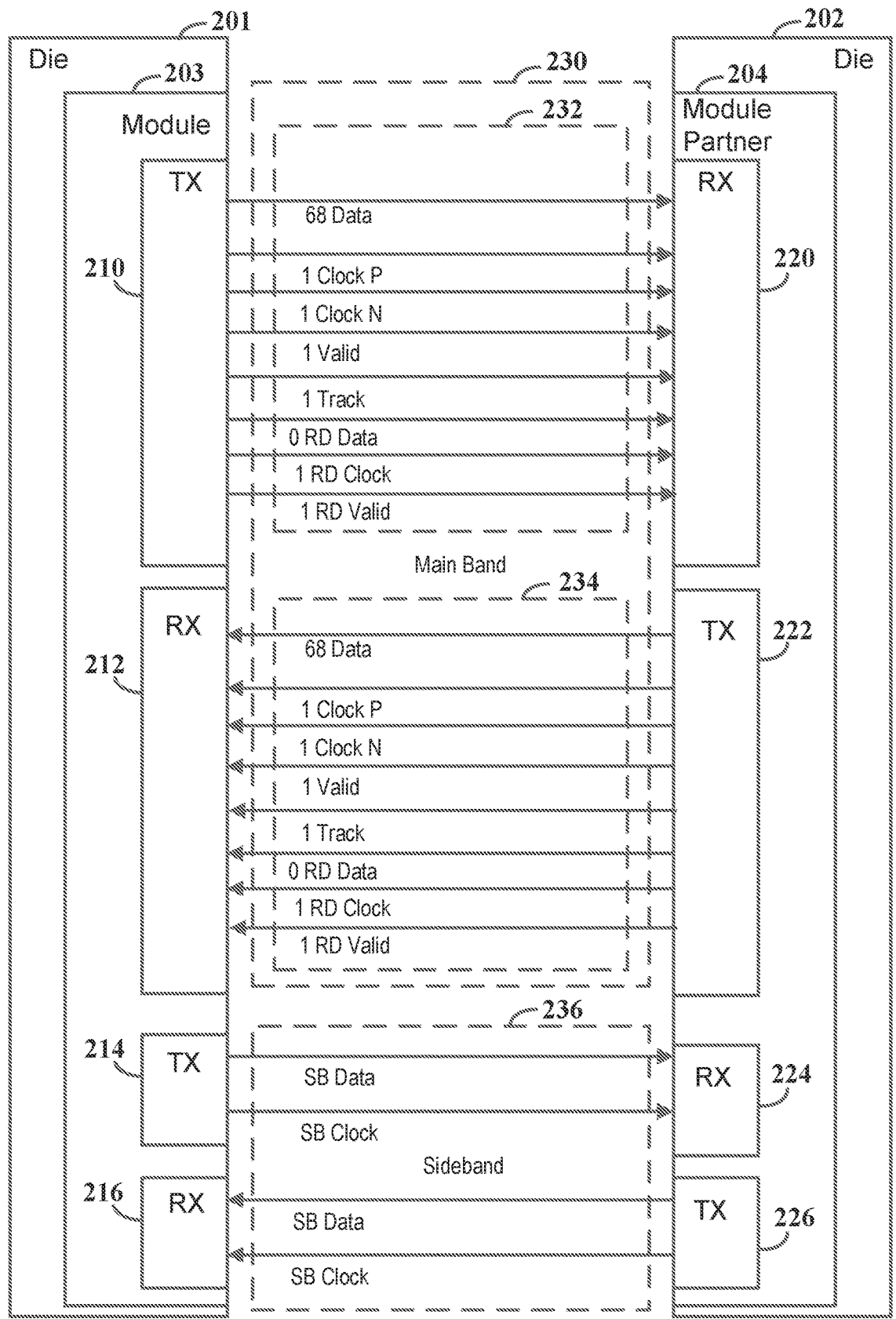
FIG. 2 is a block diagram of a module and a module partner coupled together with a 68 data lane die-to-die connection suitable for aspects of the present disclosure.

FIG. 2 is a block diagram of a first die 201 with a module 203 and second die 202 with a module partner 204 coupled together with a 64-lane die-to-die connection 200, e.g., a UCIe Advanced package interconnect, according to some aspects. The module 203 has a main band transmitter 210 that is connected to a transmit part 232 of a main band 230. The transmit part 232 includes 68 transmit data lines, a clock P line, a clock N line, a valid line, and a track line. The Advanced package main band transmit part 232 also includes 0 redundant data lines, a redundant clock line, and a redundant valid line. The redundant data lines are reconfigured as data lines together with the 64 data lines for 68 active simultaneous data lines. The transmit part 232 is coupled to a main band receiver 220 of the module partner 204. The module 203 has a main band receiver 212 that is connected to a receive part 234 of the main band 230. The receive part 234 includes 68 receive data lines, a clock P line, a clock N line, a valid line, a track line, 0 redundant data lines, a redundant clock line, and a redundant valid line. The receive part 234 is coupled to a main band transmitter 222 of the module partner 204.

The module also has a sideband transmitter 214 coupled through the sideband 236 of the die-to-die connection 200 to a sideband receiver 224 of the module partner 204. The sideband 236 may be the same or similar to the sideband example of FIG. 1. The module 203 has a sideband receiver 216 that is coupled through the sideband 236 of the die-to-die connection 200 to a sideband transmitter 226 of the module partner 204. The sideband has a bidirectional data lane and a bidirectional clock lane.

The redundant data lines in each direction are reconfigured as data lines to expand the data link width of the main band to an expanded data link width. The transmit data lines and the receive data lines may be configured differently. For example, data link width may be 68 lines in the transmit direction and 64 data lines in the receive direction or vice versa. This may be suitable, for example, in the event that there is more data traffic in one direction than in the other. CXL has a primary mode that has a 68-byte FLIT. With 64 data lanes, two transfers are used to transmit or receive one 68-byte FLIT. However, with the expanded data link width set to 68 lines, the expanded data link width corresponds to a 68-byte FLIT of CXL. Accordingly, an entire FLIT may be transferred in a single data transfer. The particular numbers of lines are provided as examples in the context of UCIe 1.0 and different numbers of lines may be used to suit different die-to-die interconnections.

In a UCIe 1.0 Advanced Package, 64 MainBand data lanes are used for data transfer. So, a maximum of 64 bytes of data can be transferred in a single data transfer. For a 68-byte FLIT, the default FLIT used in CXL2.0) transmission. The alignment of the FLIT does not exactly match the number of physical data lanes. The remaining 4 bytes of the first 68 bytes are shifted to the next consecutive data transfer. This allows only 60 of the 68 bytes of the second FLIT to be sent with the second data transfer. 8 bytes of the 68 bytes are then shifted to the third data transfer. This continues with each consecutive FLIT having an additional 4 bytes shifted to the next data transfer. When the transmitter of the module or module partner has no more FLITS to send, it terminates the data stream with e.g., a Pause of Data Stream (PDS) token and two subsequent transfers of all 0-value data. The two subsequent transfers of all 0 data give the receiver of the module partner or module at least two 64-byte transfers to reset the receiving byte shifter. Using 68 MainBand data lanes allows the full 68-byte FLIT to be sent with a single data transfer and eliminates the shifting.

Figure 3:
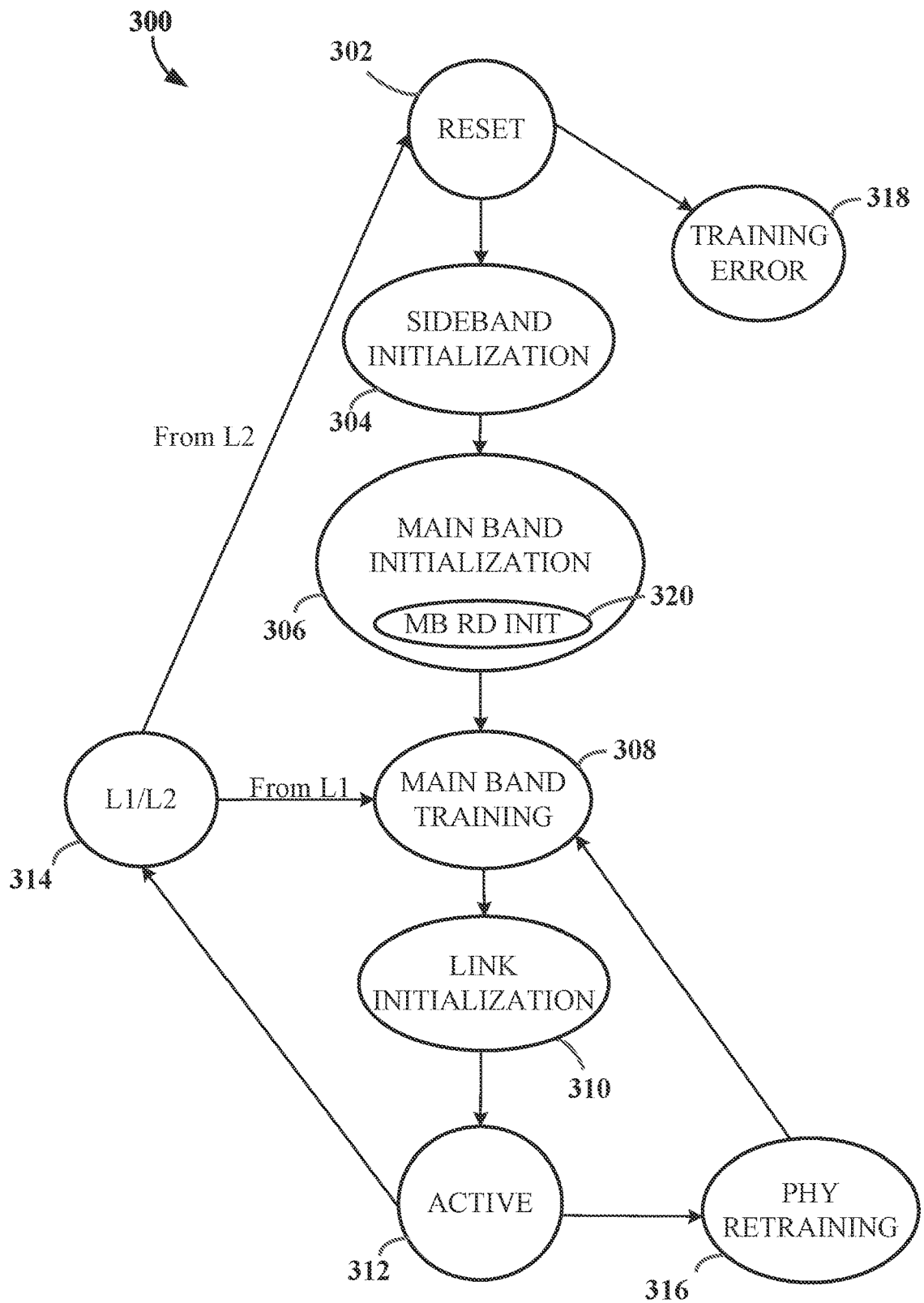
FIG. 3 is a diagram of a connection operation state machine according to aspects of the present disclosure.

FIG. 3 is a state machine diagram of a connection operation state machine 300, according to some aspects. The state machine is related to a link layer form of the physical layer connection, e.g., 100, 200 described above. The same state machine may be used for UCIe Advanced mode or other configurations with adaptations to accommodate the differences in the lanes, as described above. In UCIe 1.0, as a part of the MainBand link training, the module and the module partner must go through various phases of link initialization. First the link is in a reset state 302. The link stays in the reset state 302 for a minimum of 4 ms to allow the phase locked loops (PLLs) and other link transmitter and receiver components to stabilize. The link progresses through a SideBand initialization state 304 (referred to as SBINIT), MainBand initialization state 306 (referred to as MBINIT), MainBand training state 308 (referred to as MBTRAIN), and link initialization state 310 (referred to as LINKINIT) states, to come to an active state 312 (referred to as ACTIVE). The MBINIT state initializes the Clock P, Clock N, Clock RD, Track and Valid lanes in the UCIe Advanced package.

Considering FIG. 3, the state machine 300 begins with a reset state 302 which may be obtained upon startup or upon recovery from a deep sleep or low power state, e.g., L2 state 314, or to recover from a failure. The reset state 302 may also be entered by command from higher level layers of the die, e.g., a command to switch to a different main band data link width.

From the reset state 302, the state machine enters a sideband initialization state 304. The sideband is a low speed, high reliability part of the die-to-die connection. It is configured to be easily initialized even when there are other failures or difficult environmental conditions. After the sideband initialization state 304, the state machine may advance to a main band initialization state 306.

The main band initialization state 306 includes a main band redundant data line initialization (MB RD INIT) sub-state 320. Data link width support, enable, and configuration parameters may be exchanged in sideband messages during the main band initialization state 306 or as part of the main band redundant data line initialization sub-state 320 and the parameters may be stored in a link configuration register After the main band initialization state 306 is completed, the state machine advances to a main band training state 308. When training during Link bring up (i.e., when the Physical Layer transitions out of the RESET state), the hardware is permitted to attempt training multiple times. The main band training state 308 includes training the redundant data lines that are reconfigured as data lines, if any.

After the main band training state 308, the state machine 300 advances to a link initialization state 310. The link initialization state 310 refers to the connections between the module and the module partner. After the link initialization state 310, the state machine moves to an active state 312 for data communication between the module and the module partner. The state machine continues in the active state 312 until some event requires a transition.

One type of transition is to a PHY retraining state 316. The PHY retraining state 316 allows for the PHY layer of the connection to be retrained in the event of errors, or changes in circumstances or conditions on the connection. As an example, a failure of a data line or loss of a clock line may cause the state machine to transition to the PHY retraining state 316 during the active state 312. A new configuration of data lines or clock lines may be trained in the PHY retraining state 316. After the PHY retraining state 316, the state machine returns to the main band training state 308 to train the new configuration of the main band and then to the link initialization state 310 and back to the active state 312 which has been recovered from the PHY retraining state 316.

The main band training state 308 may be entered upon various other triggers. As an example, a software application may write to a start UCIe link training bit in the UCIe Link Control. This may cause the state machine to transition to the PHY retraining state 316. The die-to-die adapter may trigger main band training based on a status of the physical adapter at the die or at the module partner. A signal failure on a sideband or a new cold boot initialization.

Another type of transition is to an L1/L2 state 314. The L1/L2 state 314 includes two different low power or standby conditions to accommodate inactivity on the die-to-die connection. In order to reduce power consumption, heat generation, and/or wear on the dies or the connection components, the state machine 300 can transition to an L1 standby which disables many of the components of the connection especially across the main band part. From the L1 standby of the L1/L2 state 314, the state machine 300 transitions to the main band training state 308. From the main band training state 308, the state machine transitions to the link initialization state 310 and back to the active state 312. The L2 standby is a deeper standby with more components, including clock shut down to save more power. From L2 standby, the state machine 300 transitions from the L1/L2 state 314 back to the reset state 302. From the reset state 302, the full process of state machine transitions is performed to reach the active state 312. There may be more or fewer standby or low power states than L1 standby and L2 standby to suit different implementations.

One further state is a training error state 318 reached as a transition from the reset state 302. This state is a dead end and results in an inoperable connection. If the module is restarted, then the module re-enters the reset state 302 and may be able to initialize or may return to the training error state 318.

Figure 4:
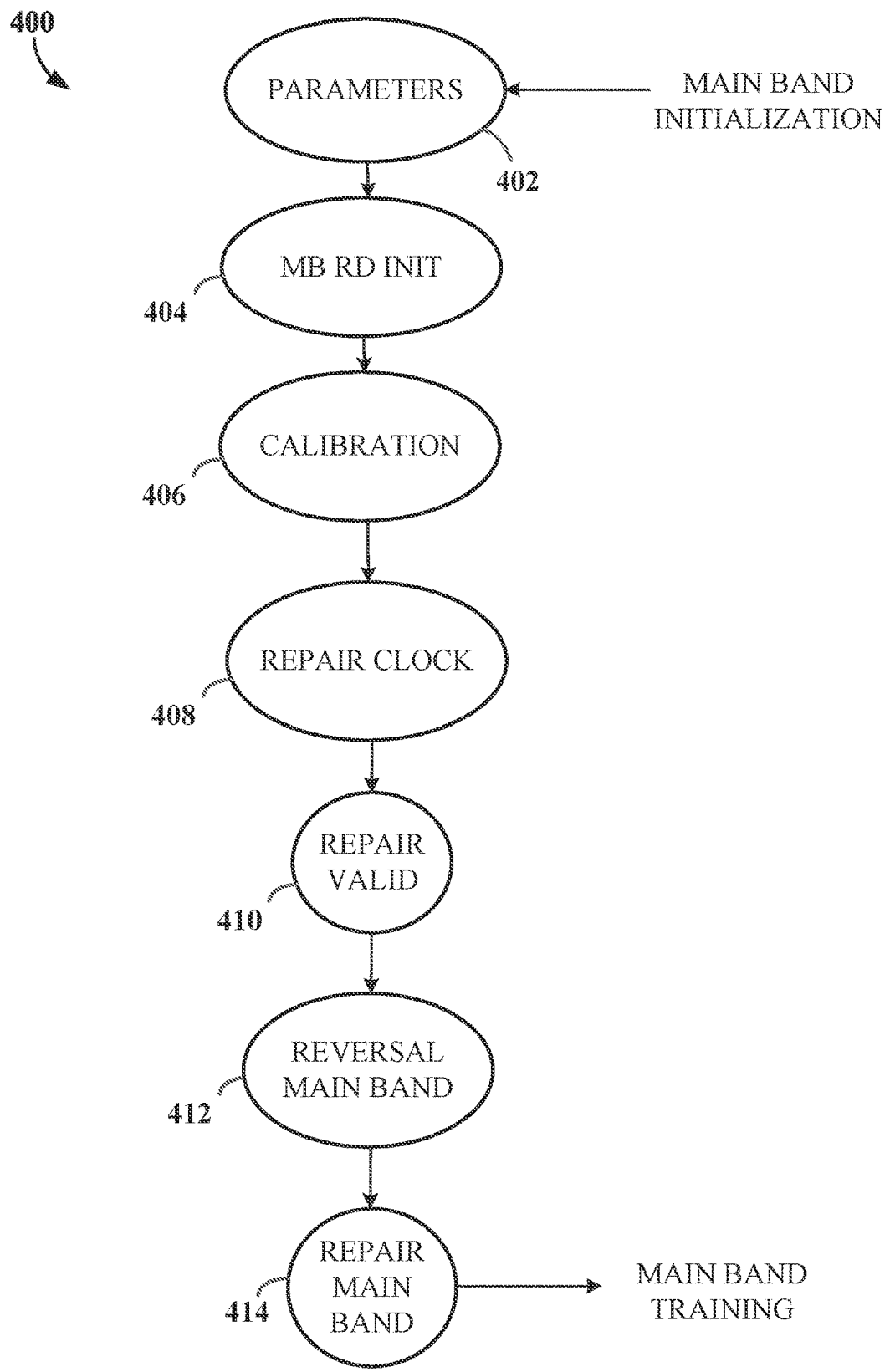
FIG. 4 is a diagram of main band initialization state machine according to aspects of the present disclosure.

FIG. 4 is a main band initialization state machine 400 which provides additional detail about the main band initialization state 306 including the main band redundant data line initialization sub-state 320, according to some aspects. The main band initialization state machine 400 is entered by the main band initialization state to a parameters state 402 during which parameters for operation of the die-to-die connection are shared between the module and the module partner. Next, a main band redundant data line initialization state 404 includes sending an enable request through the sideband to enable expanded data link widths for the die-to-die connection and receiving an enable response through the sideband to enable expanded data link widths.

The main band redundant data line initialization sub-state 404 may also include sending a support request through the sideband to support the expanded data link widths and receiving a support response to support expanded data link widths. The support request may be done only once upon initialization or support may be pre-configured in some examples. The enable request may be sent in response to receiving the support request in the main band redundant data line initialization state 404 or during another state. The main band redundant data line initialization state 404 also includes setting parameters in link configuration registers to support expanded data link widths.

Following the main band redundant data line initialization state 404, a calibration state 406 is entered to calibrate the links to use the selected clock and data lanes. The repair clock state 408 follows the calibration state 406 and allows for training patterns to be sent and received between the module and the module partner to test the clock connections between the module and the module partner through the connection. The repair valid state 410 is used to train the valid lane which is used to frame the data on the data lines. The Valid signal is a type of clock signal.

The reversal main band state 412 allows for a test of the main band to determine if reversal should be applied to the data lanes of the main band. With reversal, lane 15 or lane 63 becomes lane 0 and the designation of the lanes counts through to lane 0 which becomes lane 15 or lane 63.

The repair main band state 414 is a training state of the main band data communication in which known patterns are transmitted on the data lines to test each data lane for proper operation. Each data lane is tested in both the transmit data line and the receive data line. Upon detecting a faulty data line in either direction through the repair main band state 414, then the data link width may be modified to exclude the faulty data line. This testing allows the availability of the redundant data lines to be determined. The sending of the expanded data link width enable request is in response to the testing of the data lines and the testing of the redundant data lines. If the data lines are functional and the redundant data lines are functional, then the data link width may be expanded to include the redundant data lines. After completing the operations of the main band initialization state machine 400, the link training state machine then transitions out of the main band initialization state 306 to the main band training state 308 as shown in FIG. 3.

In UCIe 1.0, the data lanes are tested in the repair main band state when the UCIe Module sends 128 iterations of a Per Lane ID pattern (LSB first) on all N MainBand data Lanes with correct, valid framing on the Valid Lane along with the forwarded clock. N is 68 (64 Data+4 RD) for the Advanced package interface and 16 for the Standard Package interface. The UCIe Module Partner performs a per lane compare on its receivers on all N Lanes. Detection on a lane is considered successful if at least 16 consecutive iterations of the Per Lane ID pattern are detected. The UCIe Module Partner logs the detection result for the receive lines. After sending 128 iterations of the Per Lane ID pattern, the UCIe Module stops sending the pattern and sends a MBINIT.REVERSALMB result req sideband message to get the logged result. The UCIe Module Partner stops the comparison and responds with a MBINIT.REVERSALMB result resp sideband message with N-bit (68 for Advanced and 16 for Standard Package interface) per lane result.

Figure 5:
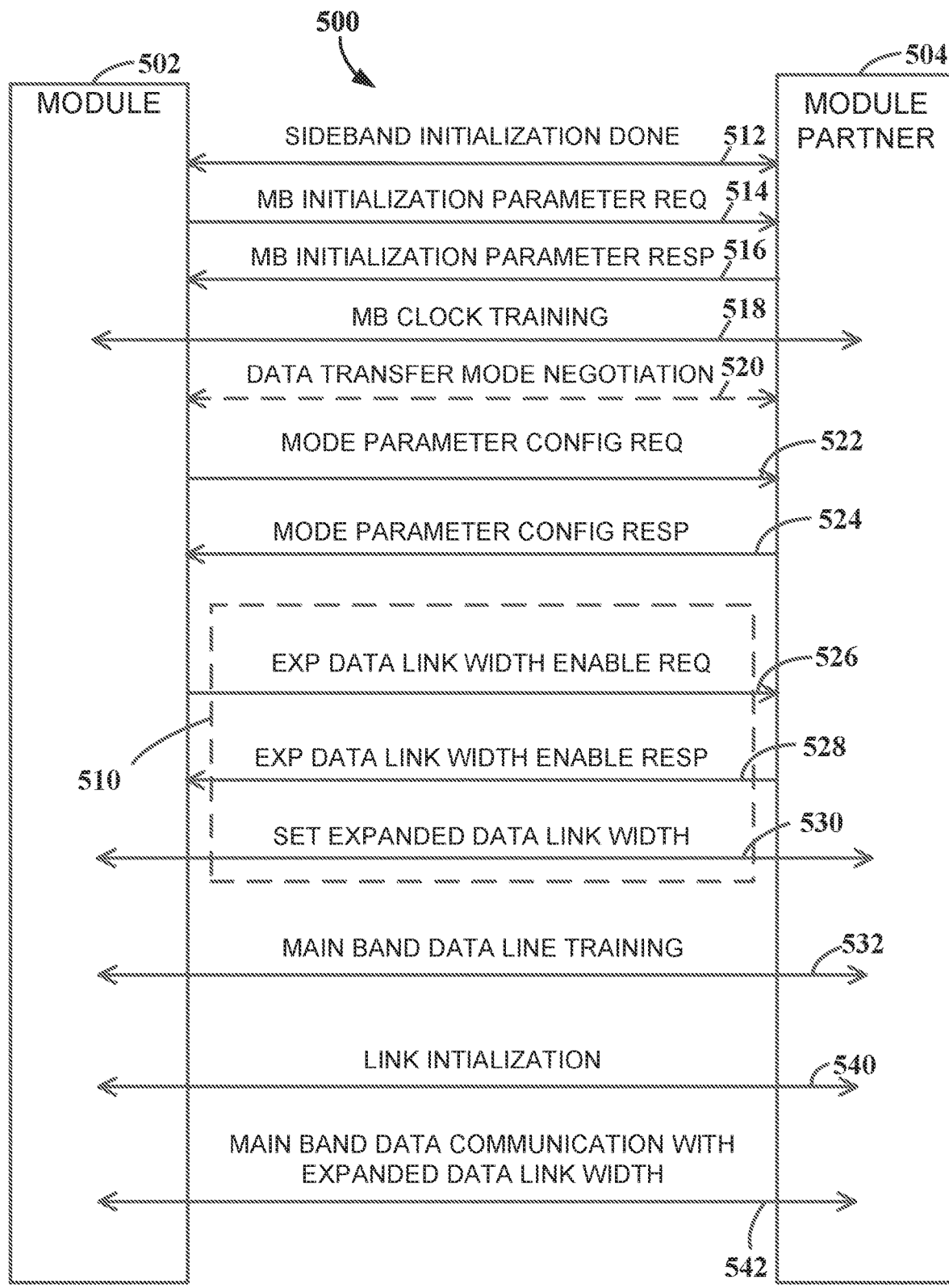
FIG. 5 is a signaling diagram of messages between a module and a module partner to initialize a main band with an expanded data link width according to aspects of the present disclosure.

FIG. 5 is a signaling diagram of messages between a module 502 of a first die and a module partner 504 of a second die to initialize a main band using an expanded data link width for the main band, according to some aspects. The signaling 500 may be used when a die-to-die adapter processor moves from the reset state 302 of FIG. 3. This may occur, for example, on startup or in a transition from an L2 state 314. In some examples, a higher layer sends a request to the module to switch from a first data transfer mode with a smaller FLIT, e.g. 32 or 64 bytes, to a second data transfer mode with a larger FLIT, e.g., 68 bytes. The signaling 500 begins after sideband initialization has been performed. The module and the module partner send messages of sideband initialization done 512. This corresponds to the end of the sideband initialization state 304 of FIG. 3. The module 502 then sends a main band initialization parameter request 514 to the module partner 504. The module partner 504 replies with a main band initialization parameter response 516. These are exchanged through the initialized sideband.

The module 502 and module partner 504 may use this response and request to include an expanded data link width handshake. An expanded data link width handshake may be used to determine whether an expanded data link width is supported by including a data link width support parameter in the main band initialization parameter request 514 and a variable link with support parameter configuration response in the main band initialization parameter response 516. A data link width enable parameter may also be included in the main band initialization parameter request 514 and the main band initialization parameter response 516. The parameters may include any other suitable expanded data link width parameters or support and enablement may be communicated in another way. The parameters may then be stored in a link configuration register. In one example, expanded data link width support is a part of the initial configuration and is not part of the expanded data link width handshake. In one example, enablement is a part of the initial configuration and is not part of the expanded data link width handshake.

UCIe 1.0 provides a more specific example for a parameter exchange. There is an exchange referred to as MBINIT.PARAM. Parameters for supporting and enabling the expanded data link width may be exchanged during this exchange or during a different operation. In UCIe 1.0, for both Standard package and Advanced package, the Main-Band initialization request message is referred to as MBINIT.PARAM configuration req. This is a sideband request to exchange parameters with the UCIe Module Partner. The request includes the parameters. The response from the module partner is referred to as MBINIT.PARAM configuration resp and is also a sideband message.

The module 502 then initiates main band clock training 518. This may start with an enable request through the sideband to the module partner 504 for the main band clock training to begin. The module partner 504 replies with a main band clock training enable response to indicate the module partner is ready to receive iterations of the clock training pattern. The iterations of the clock training pattern are sent on each transmit line and after the training patterns are ended the module partner sends a report of the results to the module. The same process is then repeated for the opposite direction with iterations of the training pattern sent on each receive line from the module partner to the module. In UCIe 1.0, the clock repair process on each line includes 128 iterations of a clock repair pattern (referred to as CLKREPAIR or the "Per Lane ID" pattern). The module partner receiver is required to detect at least 16 iterations of the training pattern to determine successfully receiving the training pattern.

At 520 the module 502 and module partner 504 optionally perform a data transfer mode negotiation. The data transfer mode will determine the size of a FLIT or the data link width that is sent between the module and the module partner. As examples, several data transfer modes are compute express link modes. CXL 2.0 includes a CXL 68-byte FLIT Mode, a CXL 68-byte Enhanced FLIT Mode, and a CXL 256-byte FLIT Mode. PCIe 6.0 has a variety of different data transfer modes including a 64-byte FLIT mode, a 128-byte FLIT mode, and a 256-byte FLIT mode. The data transfer mode may alternatively be a compute express link mode, a peripheral component interconnect express mode, a streaming protocol mode or any other suitable data transfer mode. Alternatively, the data transfer mode may be pre-configured or determined during the main band initialization.

In response to the data transfer mode negotiation 520, if any, at 522, the module 502 sends a mode parameter configuration request to the module partner 504 through the sideband to initialize the main band for a first data transfer mode. At 524, the module 502 receives a mode parameter configuration response from the module partner 504 through the sideband to initialize the main band for the first mode. The first mode may be any of the data transfer modes mentioned above, e.g., PCIe 64-byte FLIT or CXL 68-byte FLIT or any other mode, At 510 an expanded data link width may be enabled or disabled in response to the data transfer mode which was set by the mode parameter configuration request 522 and response 524. At 526, in response to the receiving the mode parameter configuration response, the module sends an expanded data link width enable request to the module partner 504 through the sideband. In some examples, the request is to set an expanded data link width of the main band of the die-to-die connection. The expanded data link width includes data lines of the main band and redundant data lines of the main band reconfigured as data lines. In some examples, the request is to set a reduced data link width that does not include any redundant data lines. The expanded data link width enable request may transition the main band from a reduced data link width to an expanded data link width or vice versa.

At 528, the module 502 receives an expanded data link width enable response 528 from the module partner 504 through the sideband to set the expanded data link width of the main band. At 530, the module and the module partner set the data link width in response to the expanded data link width enable. In some aspects, the expanded data link width is set by configuring transmit data lines and configuring transmit redundant data lines for data. Similarly, receive data lines and receive redundant data lines are set for data. In some examples, the link width parameter has a different transmit link width from the receive link width and the data link is set for two different link widths, one for each direction.

After the expanded data link width is enabled at 510, the configured main band data lines are trained at 532. Any suitable data line training may be used and corresponds to the main band training state 308 of FIG. 3. Link initialization 540 corresponds to the link initialization state 310 of FIG. 3. With the main band initialized, the signaling continues to communicating data with the module partner through the main band data communication using the expanded data link width 542. This corresponds to the active state 312 in FIG. 3.

Figure 6:
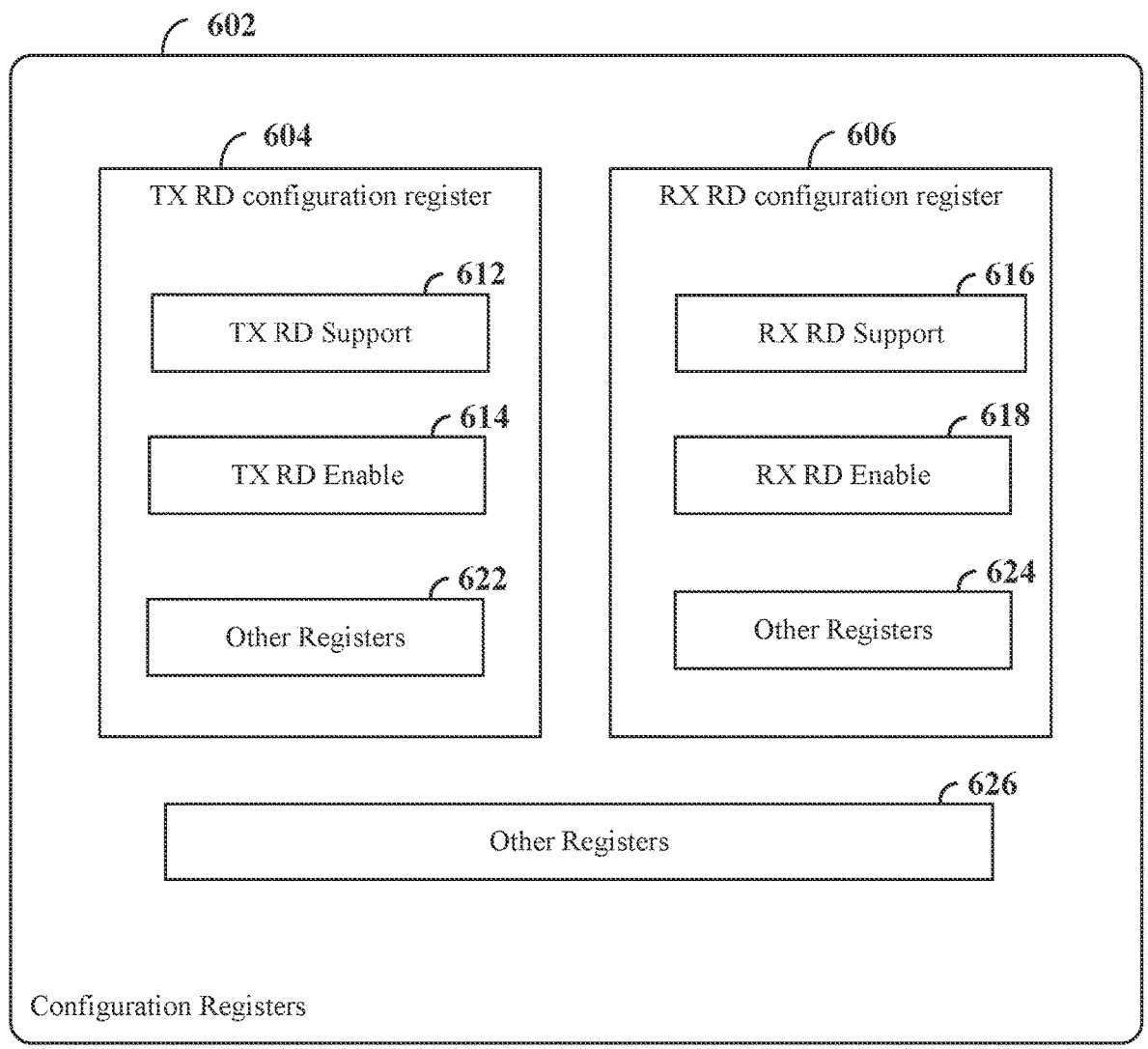
FIG. 6 is a block diagram of configuration registers according to aspects of the present disclosure.

FIG. 6 is an example of configuration registers 602 suitable for use with an expanded data link width as described herein. The configurations registers 602 are an example of a portion of a link configuration register, referred to herein as config_reg, that may be configured to support expanded data link width for a main band, e.g., a MainBand for the Advanced package or a MainBand for the Standard package. The configuration registers 602 include a transmit redundant configuration register 604 and a receive redundant register 606. The transmit redundant configuration register may include other registers 622 and the receive redundant register 606 may include other registers 624 which may be used for any of the other parameters descried herein. Other registers 626 may be added to accommodate more link variations and for other connection configurations.

In some aspects, the value in each position is set to zero by default and upon initiation. During the main band initialization state 306 and, in particular, the main band redundant data line initialization sub-state 320, described above, a sideband support request is sent to the module partner to support expanded data link width for the main band data lines. This may be a part of the main band initialization parameter request 514 and may include a support parameter. Upon receiving a sideband support response from the module partner, shown as the main band initialization parameter response 516, which may include a support parameter, a support bit may be added to the configuration register.

The configuration registers 602 may include a support bit for the transmit data lines, TX_RD_Support 612, and a support bit for the receive data lines, RX_RD_Support 616. In an example, when the support bits are both "1" or high, the two dies support expanded data link width for both transmit and receive data lines. In an example, when these are both "0" or low, then the two dies do not support expanded data link width for either the transmit or receive data lines.

Upon receiving a sideband enable response from the module partner, shown as the expanded data link width enable response 528, the enable configuration parameters of FIG. 6 may be set for the expanded data link width. In particular, TX_RD_Enable 614 indicates whether expanded data link width is enabled for the main band transmit data lines. RX_RD_Enable 618 indicates whether the expanded data link width is enabled for the main band receive data lines. As an alternative, a single enable bit may be used for transmit lines and receive lines so that both directions are treated the same. Based on the register settings of FIG. 6, the main band redundant data lanes can be aggregated for data transfer along with the functional data lanes for that module.

The use of the redundant lanes may be determined using the configuration registers. This may be set during the main band redundant data line initialization sub-state 320. When the TX_RD_Enable bit is set to 1, the four transmit redundant lanes are used for the main band data lines along with the 64 main band active data lines for data transfer. When the TX_RD_Enable bit is set to 0, then the 4 transmit redundant data lanes are not used along with the 64 main band active data lines for transfer. Similarly, when the RX_RD_Enable bit is set to 1, the four receive redundant lanes are used along with the 64 main band active data lanes for data transfer.

Figure 7:
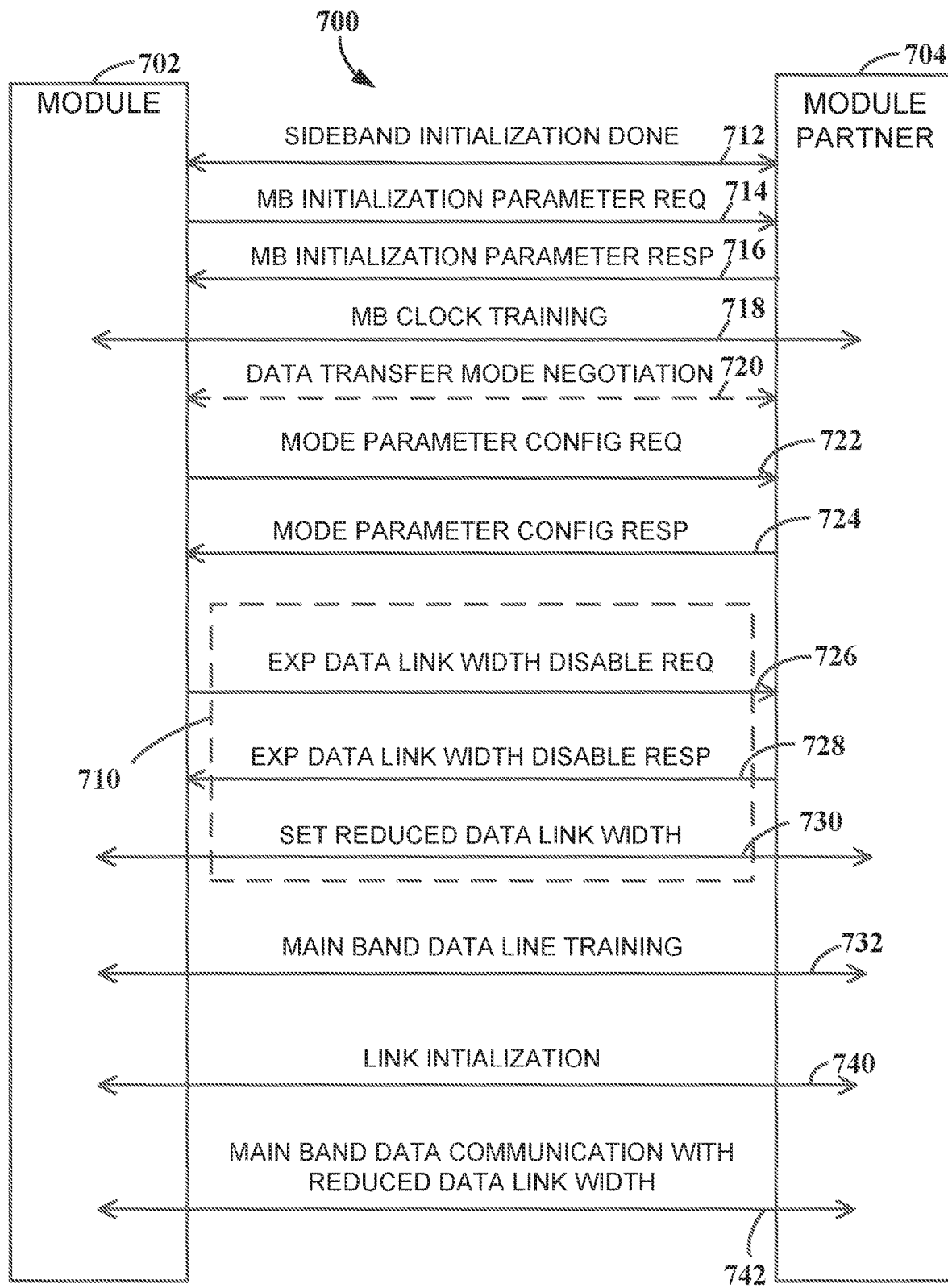
FIG. 7 is a signaling diagram of messages between a module and a module partner to initialize a main band with a reduced data link width according to aspects of the present disclosure.

FIG. 7 is a signaling diagram of messages between a module 702 of a first die and a module partner 704 of a second die to initialize a main band in a transition from an expanded data link width to a reduced data link width for the main band, according to some aspects. The signaling 700 may be used when a die-to-die adapter processor moves from the reset state 302 of FIG. 3. This may occur, for example, on startup or in a transition from an L2 state 314. The signaling 700 begins after sideband initialization has been performed. The module and the module partner send messages of sideband initialization done 712. This corresponds to the end of the sideband initialization state 304 of FIG. 3. The module 702 then sends a main band initialization parameter request 714 to the module partner 704. The module partner 704 replies with a main band initialization parameter response 716. These are exchanged through the initialized sideband.

The module 702 and module partner 704 may use this response and request to include an expanded data link width handshake. An expanded data link width handshake may be used to determine whether an expanded data link width is supported by including a data link width support parameter in the main band initialization parameter request 714 and a variable link with support parameter configuration response in the main band initialization parameter response 716. A data link width enable parameter may also be included in the main band initialization parameter request 714 and the main band initialization parameter response 716. The parameters may include any other suitable expanded data link width parameter or support and enablement may be communicated in another way. The parameters may then be stored in a link configuration register. In one example, expanded data link width support is a part of the initial configuration and is not part of the expanded data link width handshake. In one example, enablement is a part of the initial configuration and is not part of the expanded data link width handshake.

The module 702 then initiates main band clock training 718. At 720 the module 702 and module partner 704 optionally perform a data transfer mode negotiation to determine the size of a FLIT that is sent between the module and the module partner. In this example, the data link width will be changed from an expanded data link width, e.g., 68 bytes, to a reduced data link width, e.g., 64 bytes. This may be due to change in the data transfer mode or due to a failure of one of the data lines or one of the redundant data lines.

In response to the data transfer mode negotiation 720, if any, at 722, the module 702 sends a mode parameter configuration request to the module partner 704 through the sideband to initialize the main band for a second data transfer mode. The second data transfer mode will have a reduced FLIT compared to the first data transfer mode or will operate with a reduced data link width due to physical or other considerations. At 724, the module 702 receives a mode parameter configuration response from the module partner 704 through the sideband to initialize the main band for the first mode.

At 710 an expanded data link width may be disabled in response to the data transfer mode which was set by the mode parameter configuration request 722 and response 724. At 726, in response to the receiving the mode parameter configuration response, the module sends an expanded data link width disable request to the module partner 704 through the sideband. In the present examples, the request is to set a reduced data link width that does not include any redundant data lines. The redundant data lines are reconfigured as redundant are not a part of the data link of the die-to-die connection. The expanded data link width disable may transition the main band from an expanded data link width to a reduced data link width.

At 728, the module 702 receives an expanded data link width disable response from the module partner 704 through the sideband to set the reduced data link width of the main band. At 730, the module and the module partner set the data link width in response to the expanded data link width disable. As shown, this is a reduced data link width. The reduced data link width is set by configuring transmit data lines and configuring transmit redundant data lines as redundant. In some examples, one or more data lines has failed and the redundant data lines are reconfigured for use as data lines but the data link width is not expanded beyond the standard of e.g., 64 data lines. The link width parameter may have a different transmit link width from the receive link width and the data link is set for two different link widths, one for each direction.

After the expanded data link width is disabled at 710, the configured main band data lines are trained 732. Any suitable data line training may be used and corresponds to the main band training state 308 of FIG. 3. Link initialization 740 corresponds to the link initialization state 310 of FIG. 3. With the main band initialized, the signaling continues to communicating data with the module partner through the main band data communication with a reduced data link width 742. This corresponds to the active state 312 in FIG. 3.

Figure 8:
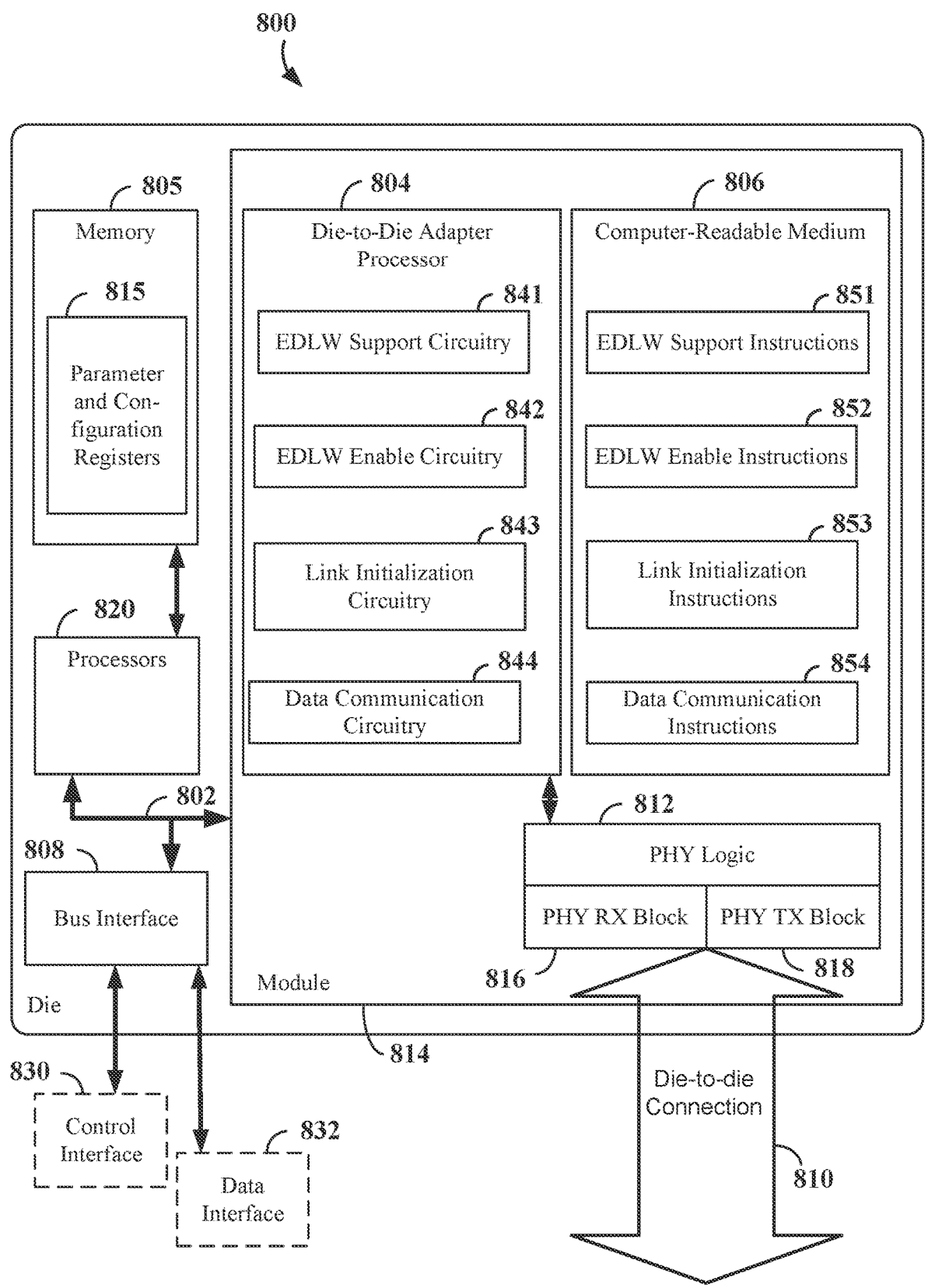
FIG. 8 is a block diagram of a die with a module according to aspects of the present disclosure.

FIG. 8 is a block diagram of an example of a hardware implementation for a die 800 e.g., a central processor, a graphics processor, a special purpose processor, a volatile memory, a non-volatile memory, an input/output controller, or any other suitable components with a die-to-die connection 810 having a sideband and a main band. In this example, the die has processors 820 for performing the primary operations of the die and a memory 805. The die has a module 814 to support a die-to-die connection 810 with a die-to-die adapter processor 804, a computer-readable medium 806, PHY logic 812, a PHY receive block 816 and a PHY transmit block 818. The die-to-die adapter processor 804 performs the operations described above to service the die-to-die connection 810 between the die 800 and one or more other dies (not shown).

In accordance with various aspects of the disclosure, an element, or any portion of an element, or any combination of elements may be implemented with the module 814. Examples of the module 814 include microprocessors, microcontrollers, digital signal processors (DSPs), field programmable gate arrays (FPGAs), programmable logic devices (PLDs), state machines, gated logic, discrete hardware circuits, and other suitable hardware configured to control the die-to-die connection 810 and the clocking modes as described throughout this disclosure. In various examples, the die 800 may be configured to perform any one or more of the functions described herein. The die contains other components (not shown) configured to perform other functions of the die as is suitable for the type of die.

In this example, the module has a module with processors 820 for performing the primary operations of the module, a memory 805, and a computer-readable medium 806. A die-to-die adapter processor 804 performs the operations described above to service the interconnection between the module 814 and a module partner or another module. In accordance with various aspects of the disclosure, an element, or any portion of an element, or any combination of elements may be implemented with the module 814. Examples of the processor include a central processor, a graphics processor, a special purpose processor, a memory controller, and an input/output controller. Examples of the die-to-die adapter processor 804 include microprocessors, microcontrollers, digital signal processors (DSPs), field programmable gate arrays (FPGAs), programmable logic devices (PLDs), state machines, gated logic, discrete hardware circuits, and other suitable hardware configured to control the die-to-die connection and the clocking modes as described throughout this disclosure. In various examples, the module 814 may be configured to perform any one or more of the functions described herein. The module contains other components (not shown) configured to perform other functions of the module as is suitable for the type of die.

In this example, the die 800 may be implemented with a bus architecture, represented generally by the bus 802. The bus 802 may include any number of interconnecting buses and bridges depending on the specific application of the module 814, the die 800 and the overall design constraints.

The bus 802 communicatively couples together various circuits including processors 820, the die-to-die adapter processor 804, the memory 805, and the computer-readable media (represented generally by the computer-readable medium 806) having instructions stored thereon. The bus 802 may also link various other circuits such as timing sources, peripherals, data buffers, modules, power management circuits, and other processing cores, which are not described any further. A bus interface 808 provides an interface between the bus 802 and other optional external interfaces e.g., a control interface 830 and a data interface 832, etc. The processors 820 are a higher layer with respect to the die-to-die adapter processor 804 and coupled to the die-to-die adapter processor through the bus 802. The processors 820 may communicate operations, administration, or management control with the die-to-die adapter processor 804 or the die-to-die adapter processor 804 may operate autonomously. In some examples, the die-to-die adapter receives a request to expand or reduce a data link width of the main band from a higher layer, e.g., the processors 820. The higher layer may also send requests to switch from a first data transfer mode to a second data transfer mode.

The control interface 830 may be used to provide a communication interface or means of communicating with various other apparatuses and devices (for example, other devices housed within the same package or system) over an internal bus or external transmission medium, such as command and control interface for power regulation, power-on test, and other purposes. The data interface 832 may be used to provide data connections other than the die-to-die connection 810 to other types of components within the package or system. The control interface 830 and the data interface 832 may be connected to a higher layer to receive reset and configuration commands that may cause the die-to-die processor to switch to a single clock mode.

The module 814 includes a PHY receive block 816 that corresponds to the sideband and main band receivers described above and a PHY transmit block 818 that corresponds to the sideband and main band transmitters described above. The PHY receive block 816 and the PHY transmit block 818 are coupled to the die-to-die connection 810 that corresponds to the physical part of the sideband 136 and main band 130 lanes described above that couple the first die 101 and the second die 102 through pins on respective die connectors. The module also includes PHY logic 812 which may include the link logic to control the data applied to each line and the state machines described above under the control of the die-to-die adapter processor. The PHY logic 812 may also include clock generators coupled to clock sources to generate the sideband and main band clock signals as described above.

The die-to-die adapter processor 804 is responsible for managing the PHY logic 812 and for interface processing, including the execution of software stored on the computer-readable medium 806. The software, when executed by the die-to-die adapter processor 804, causes the module 814 to perform the various functions described below for any particular apparatus. The computer-readable medium 806 and the memory 805 may also be used for storing data that is manipulated by the die-to-die adapter processor 804 when executing software.

The die-to-die adapter processor 804 may be a part of the processors 820 or of one or more other processor cores of the die 800 (not shown) and perform operations by means of a processor core executing software stored in the computer-readable medium 806, or the die-to-die adapter processor 804 may be independent of any other processing resources of the die 800 to execute software stored on the computer-readable medium 806 using its own processing resources. Software shall be construed broadly to mean instructions, instruction sets, code, code segments, program code, programs, subprograms, software dies, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The die-to-die adapter processor 804 controls the operations performed by state machines, e.g., those of FIGS. 3 and 4, and causes the signaling 500, 700 of the signaling diagrams and causes the clock repair training patterns to be transmitted and received.

The computer-readable medium 806 may be a non-transitory computer-readable medium. A non-transitory computer-readable medium includes, by way of example, a magnetic storage device, a flash memory device, a random access memory (RAM), a read only memory (ROM), a programmable ROM (PROM), an erasable PROM (EPROM), an electrically erasable PROM (EEPROM), a register, and any other suitable medium for storing software and/or instructions that may be accessed and read by a controller. The computer-readable medium 806 may reside in the module 814 or another part of the die 800. The computer-readable medium 806 may be embodied in a firmware for the operation of a state machine or parameters of an ASIC. Those skilled in the art will recognize how best to implement the described functionality presented throughout this disclosure depending on the particular application and the overall design constraints imposed on the overall system.

The die 800 may be configured to perform any one or more of the operations described herein. In some aspects of the disclosure, the die-to-die adapter processor 804, as utilized in the die 800, may include circuitry configured for various functions. The die-to-die adapter processor 804 is coupled to the memory 805 through the bus 802. The memory 805 includes parameter and configuration registers 815 that may include parameters for different data link widths for the data lanes as shown in FIG. 6. Any other parameters and configuration values may also be stored including those for the operation of the main band in PCIe or CXL operation.

The die-to-die adapter processor 804 may include expanded data link width (EDLW) support circuitry 841 to send requests and receive responses with a module partner to support EDLW for data lanes of a main band and to set a support parameter in a link configuration register of the parameter and configuration registers 815. The EDLW support circuitry 841 may include one or more hardware components that provide the physical structure that performs various processes related to sending requests and receiving responses with a module partner to support EDLW and to set a support parameter. The EDLW support circuitry 841 may include functionality for a means for sending an EDLW support request to a module partner and a means for receiving an EDLW support response from the module partner through a sideband to support EDLW for data lanes of a main band and means for setting a support parameter in a link configuration register of the parameter and configuration registers 815. The EDLW support circuitry 841 may further be configured to execute EDLW support instructions 851 included on the computer-readable medium 806 to implement the EDLW support described herein.

The die-to-die adapter processor 804 may include EDLW enable circuitry 842 configured to send and receive EDLW enable and disable requests to the module partner and receive EDLW enable and disable responses from the module partner through the sideband. The enable request is to enable the use of an expanded data link width (EDLW) from a receiver, e.g., a module partner, to a transmitter, e.g., a module, as discussed herein. The EDLW enable circuitry 842 may include functionality for a means responsive to a command or table inference from e.g., FIG. 6 to enable EDLW and to send and receive requests and responses to enable EDLW. A command may be in the form of receiving a request from a higher layer, e.g., processors 820 or through the control interface 830, to switch from a first data transfer mode to a second data transfer mode. The EDLW enable circuitry may further set parameters, an enable bit and additional parameters, for operating EDLW in a link configuration register. The EDLW enable circuitry 842 may further be configured to execute EDLW enable instructions 852 included on the computer-readable medium 806 to implement one or more functions described herein.

The module 814 die-to-die adapter processor 804 may include link initialization circuitry 843 configured to perform operations initializing a main band at a specified transmit data link width and a specified receive data link width as discussed herein. The link initialization circuitry 843 may include functionality for initializing the link and may also include functionality for main band clock training and main band data line training. The link initialization circuitry 843 may include functionality for a means for receiving an automatic result in response to initiating iterations of a training pattern on a clock line. The link initialization circuitry 843 may further be configured to execute link initialization instructions 853 included on the computer-readable medium 806 to implement one or more functions described herein.

The die-to-die adapter processor 804 may include data communication circuitry 844 configured to communicate data with another module through a main band of the die-to-die connection 810 using the initialized main band with the clock training process, as discussed herein. The data communication circuitry 844 may include functionality for a means for communicating data with another module through a main band. The data communication circuitry 844 may further set parameters for communicating through the main band using the expanded data link width or a reduced data link width. The data communication circuitry 844 may further be configured to execute data communication instructions 854 included on the computer-readable medium 806 to implement one or more functions described herein.

The circuit architecture described herein may be implemented on one or more ICs, chips, chiplets, modules, interposers, packages, system printed circuit boards (PCBs), etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

Figure 9:
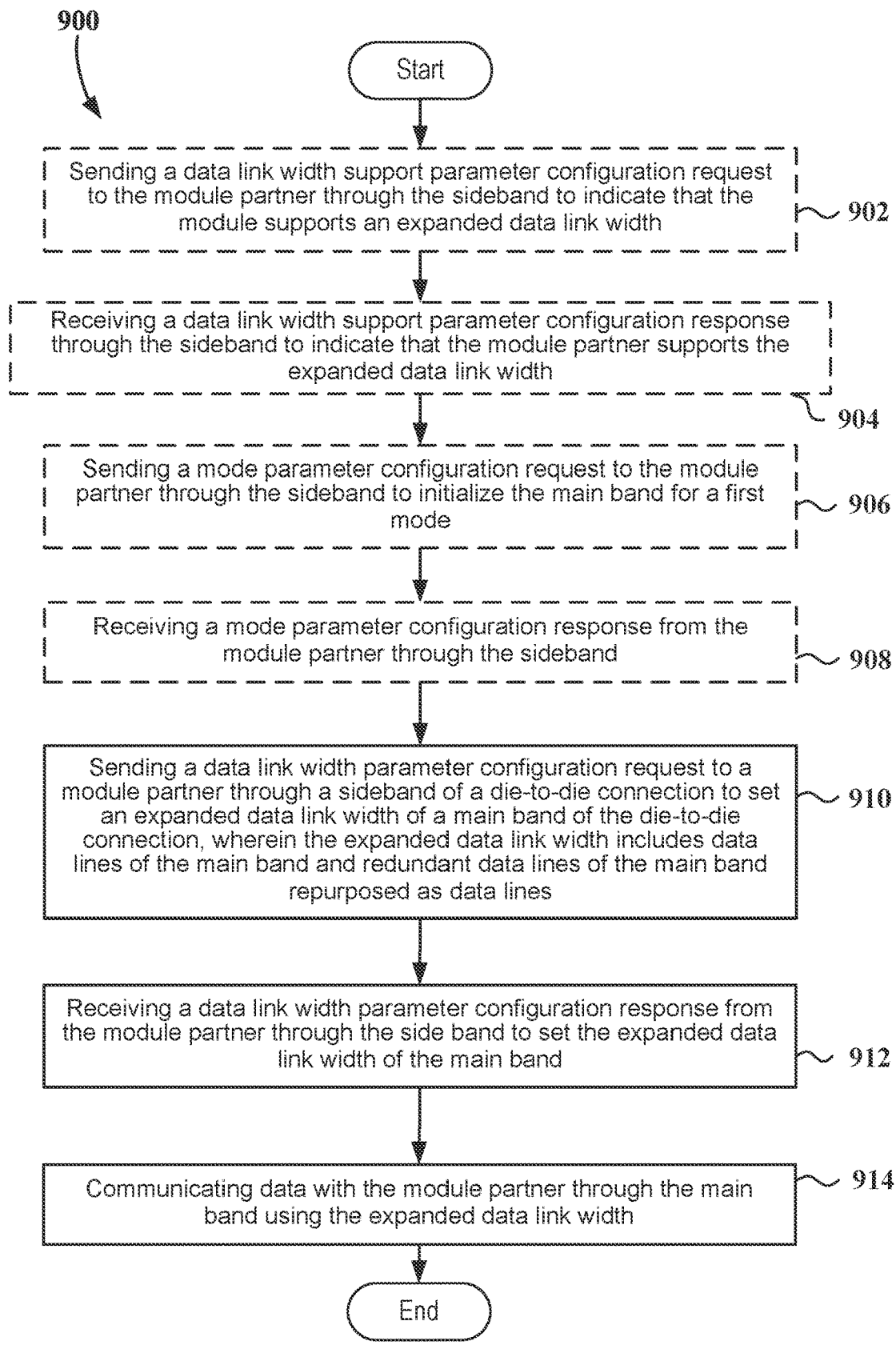
FIG. 9 is a flow diagram of aspects of operating a die-to-die connection with an expanded data link width according to aspects of the present disclosure.

FIG. 9 is a process flow diagram illustrating an example of a method for expanded data link width operation for data lanes of a main band with a die-to-die connection such as the connections of FIGS. 1 and 2. The method may be performed in the die-to-die adapter processor 804 of FIG. 8 or other circuitry, and software as described in the context of FIG. 8. The method 900 optionally begins at block 902 with sending a data link width support parameter configuration request to the module partner through the sideband to indicate that the module supports an expanded data link width. Sending the support request may be performed during a main band initialization. Alternatively, the dies may be configured to support an expanded data link width without any handshake of support parameters.

Responsive to the request message, the module partner may optionally send a response. The method 900 continues in block 904 with optionally receiving a data link width support parameter configuration response through the sideband to indicate that the module partner supports the expanded data link width.

In block 906, sending a mode parameter configuration request to the module partner through the sideband to initialize the main band for a first mode is optionally performed. The module may then perform receiving a mode parameter configuration response from the module partner through the sideband at block 908. The mode parameter configuration request may include an identification of the data transfer mode including a protocol for the data transfer mode and a size of a FLIT for the data transfer mode. The mode parameter may be used to set the data link width and also to configure buffers and other parts of the physical connection between the module and the module partner. In some examples, an expanded data link width corresponds to a data transfer mode for CXL with a 68-byte FLIT and a reduced data link width corresponds to a data transfer mode for PCIe with a 64-byte FLIT.

In block 910, the module performs sending an expanded data link width enable request to a module partner through a sideband of a die-to-die connection to set an expanded data link width of a main band of the die-to-die connection. The expanded data link width may include data lines of the main band and redundant data lines of the main band reconfigured as data lines. The link width parameter may be a single bit to indicate an ON or OFF condition or it may have multiple bits to indicate one or multiple different expanded data link widths. In block 912, receiving an expanded data link width enable response from the module partner through the side band to set the expanded data link width of the main band is performed. The data link width enable request and the data link width enable response may be sent during a main band initialization.

After the expanded data link width enable bit is set and optionally stored in a configuration register together with a support and enable parameter, the data lines of the main band of the die-to-die connection may be configured for use. In block 914, communicating data with the module partner through the main band is performed using the expanded data link width. In some examples, an expanded data link width disable request and response may be sent so that the module partner communicates through the main band using a reduced data link width corresponding to a FLIT of a different data transfer mode with a different data link width than the second data transfer mode FLIT. In some examples, the reduced data link width FLIT corresponds to the data lines of the main band not including the redundant data lines.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Combinations of the above should also be included within the scope of computer-readable media.

The following provides an overview of examples of the present disclosure.

Example 1: An apparatus comprising: a sideband transmitter of a module of a first die configured to send an expanded data link width enable request to a module partner through a sideband of a die-to-die connection to set an expanded data link width of a main band of the die-to-die connection, wherein the expanded data link width includes data lines of the main band and redundant data lines of the main band reconfigured as data lines; a sideband receiver of the module configured to receive an expanded data link width enable response from the module partner through the sideband to set the expanded data link width of the main band; and a main band transmitter configured to communicate data with the module partner through the main band using the expanded data link width.

Example 2: The apparatus of example 1, further comprising a control interface to receive a request from a higher layer to switch from a first data transfer mode to a second data transfer mode and wherein the sending the expanded data link width enable request is performed in response to the request to switch to the second mode.

Example 3: The apparatus of example 1 or 2, wherein the expanded data link width corresponds to a flow control unit (FLIT) of a second data transfer mode.

Example 4: The apparatus of example 3, wherein the main band transmitter is further configured to communicate data with the module partner through the main band using a reduced data link width corresponding to a FLIT of a second data transfer mode Example 5: The apparatus of any one or more of examples 1 to 4, further comprising a configuration register configured to store an expanded data link width enable in response to receiving the expanded data link width enable response.

Example 6: A method comprising: sending an expanded data link width enable request to a module partner through a sideband of a die-to-die connection to set an expanded data link width of a main band of the die-to-die connection, wherein the expanded data link width includes data lines of the main band and redundant data lines of the main band reconfigured as data lines; receiving an expanded data link width enable response from the module partner through the sideband to set the expanded data link width of the main band; and communicating data with the module partner through the main band using the expanded data link width.

Example 7: The method of example 6, wherein the expanded data link width corresponds to a flow control unit (FLIT) of a data transfer mode.

Example 8: The method of example 7, wherein the data transfer mode comprises a Compute Express Link mode with a 68-byte FLIT.

Example 9: The method of example 6 or 7, further comprising receiving a request from a higher layer to switch from a first data transfer mode to a second data transfer mode and wherein the sending the expanded data link width enable request is performed in response to the request to switch to the second data transfer mode.

Example 10: The method of any one or more of examples 6 to 9, wherein the expanded data link width corresponds to FLIT of a second data transfer mode, the method further comprising communicating data with the module partner through the main band using a reduced data link width corresponding to a FLIT of a first data transfer mode with a different data link width than the second data transfer mode FLIT.

Example 11: The method of example 10, wherein the data link width of the first data transfer mode FLIT corresponds to the data lines of the main band not including the redundant data lines.

Example 12: The method of example 10 or 11, wherein the communicating the data comprises sending a second data transfer mode FLIT in a single data transfer through the main band.

Example 13: The method of any one or more of examples 10 to 12, further comprising: detecting a faulty data line of the main band; and sending an expanded data link width disable request to the module partner through the sideband to initialize the main band to the reduced data link width, wherein the reduced data link width excludes the faulty data line and reconfigures a redundant data line as a data line, the reduced data link width corresponding to less than the FLIT of the second data transfer mode.

Example 14: The method of any one or more of examples 6 to 13, wherein the sending the expanded data link width enable request comprises sending the expanded data link width enable request during a main band initialization.

Example 15: The method of any one or more of examples 6 to 14, wherein the sending the expanded data link width enable request comprises sending a receive data link width to identify a data link width for receive data lines and a transmit data link width to identify a data link width for transmit data lines.

Example 16: The method of any one or more of examples 6 to 15, further comprising training the main band at the expanded data link width in response to the receiving the expanded data link width enable response.

Example 17: The method of example 16, wherein the training the main band comprises training the data lines and the redundant data lines of the main band.

Example 18: The method of any one or more of examples 6 to 17, further comprising: testing data lines of the main band; and testing redundant data lines of the main band, wherein the sending the expanded data link width enable request is in response to the testing the data lines and the testing the redundant data lines.

Example 19: The method of any one or more of examples 6 to 18, further comprising storing an expanded data link width enable in a configuration register in response to the receiving the expanded data link width enable response.

Example 20: The method of any one or more of examples 6 to 19, further comprising: sending a mode parameter configuration request to the module partner through the sideband to initialize the main band for a first mode; and receiving a mode parameter configuration response from the module partner through the sideband to initialize the main band for the first mode, wherein sending the expanded data link width enable request is in response to the receiving the mode parameter configuration response.

Example 21: The method of example 20, wherein the sending the mode parameter configuration request comprises sending the mode parameter configuration request during a main band initialization.

Example 22: The method of any one or more of examples 6 to 21, further comprising before the sending the mode parameter configuration request: sending a data link width support parameter configuration request to the module partner through the sideband to indicate that the module supports an expanded data link width; and receiving a data link width support parameter configuration response through the sideband to indicate that the module partner supports the expanded data link width.

Example 23: The method of example 22, further comprising storing a data link width support parameter in a configuration register.

Example 24: A non-transitory computer-readable medium having instructions stored therein for causing a processor of a die to perform operations comprising: sending an expanded data link width enable request to a module partner through a sideband of a die-to-die connection to set an expanded data link width of a main band of the die-to-die connection, wherein the expanded data link width includes data lines of the main band and redundant data lines of the main band reconfigured as data lines; receiving an expanded data link width enable response from the module partner through the sideband to set the expanded data link width of the main band; and communicating data with the module partner through the main band using the expanded data link width.

Example 25: The medium of example 24, the operations further comprising: sending an expanded data link width enable request to a module partner through a sideband of a die-to-die connection to set an expanded data link width of a main band of the die-to-die connection, wherein the expanded data link width includes data lines of the main band and redundant data lines of the main band reconfigured as data lines; receiving an expanded data link width enable response from the module partner through the sideband to set the expanded data link width of the main band; and communicating data with the module partner through the main band using the expanded data link width.

What is claimed is:

1. An apparatus comprising:
   link initialization circuitry of a module of a first die configured to initialize a sideband of a die-to-die connection between a module and a module partner, the sideband having a receive data line and a transmit data line, wherein the sideband has a high reliability low data rate as compared to a main band of the die-to-die connection, wherein the main band comprises a plurality of data lines and a plurality of redundant data lines, wherein each redundant data line of the plurality of redundant data lines is configured to replace a failed data line of the plurality of data lines in response to a failure of the failed data line;
   a sideband transmitter of the module configured to send a sideband initialization done message through the transmit line of the sideband,
   wherein the link initialization circuitry is configured to initialize the main band in response to the initialization done message;
   wherein the sideband transmitter is configured to send an expanded data link width enable request message including an enable parameter to the module partner through the transmit line of the sideband to set an expanded data link width of the main band, wherein the expanded data link width includes the data lines of the plurality of data lines and at least one redundant data line of the plurality of redundant data lines;
   a sideband receiver of the module configured to receive an expanded data link width enable response message including the enable parameter from the module partner through the receive line of the sideband to set the expanded data link width of the main band,
   wherein the link initialization circuitry is configured to initialize the at least one redundant data line as a main band line in response to receiving the expanded data link width enable response message and to train the main band using the expanded data link width; and
   a main band transmitter configured to communicate data with the module partner through the main band using the expanded data link width.

2. The apparatus of claim 1, further comprising a control interface to receive a request from a higher layer to switch from a first data transfer mode to a second data transfer mode and wherein the sending the expanded data link width enable request is performed in response to the request to switch to the second data transfer mode.

3. The apparatus of claim 1, wherein the expanded data link width corresponds to a flow control unit (FLIT) of a second data transfer mode.

4. The apparatus of claim 3, wherein the main band transmitter is further configured to communicate data with the module partner through the main band using a reduced data link width corresponding to a FLIT of a second data transfer mode.

5. The apparatus of claim 1, further comprising a configuration register configured to store an expanded data link width enable parameter in response to receiving the expanded data link width enable response.

6. A method comprising:
initializing a sideband of a die-to-die connection between a module and a module partner, the sideband having a receive data line and a transmit data line, wherein the sideband has a high reliability low data rate as compared to a main band of the die-to-die connection, wherein the main band comprises a plurality of data lines and a plurality of redundant data lines, wherein each redundant data line of the plurality of redundant data lines is configured to replace a failed data line of the plurality of data lines in response to a failure of the failed data line;
sending a sideband initialization done message through the transmit line of the sideband;
initializing the main band in response to the initialization done message;
sending an expanded data link width enable request message including an enable parameter to the module partner through the transmit line of the sideband to set an expanded data link width of the main band, wherein the expanded data link width includes the data lines of the plurality of data lines and at least one redundant data line of the plurality of redundant data lines;
receiving an expanded data link width enable response message including the enable parameter from the module partner through the receive line of the sideband to set the expanded data link width of the main band;
initializing the at least one redundant data line as a main band line in response to receiving the expanded data link width enable response message;
training the main band using the expanded data link width; and
communicating data with the module partner through the main band using the expanded data link width.

7. The method of claim 6, wherein the expanded data link width corresponds to a flow control unit (FLIT) of a data transfer mode.

8. The method of claim 7, wherein the data transfer mode comprises a Compute Express Link mode with a 68-byte FLIT.

9. The method of claim 6, further comprising receiving a request from a higher layer to switch from a first data transfer mode to a second data transfer mode and wherein the sending the expanded data link width enable request message is performed in response to the request to switch to the second data transfer mode.

10. The method of claim 6, wherein the expanded data link width corresponds to a FLIT of a second data transfer mode, the method further comprising communicating data with the module partner through the main band using a reduced data link width corresponding to a FLIT of a first data transfer mode with a different data link width than the second data transfer mode FLIT.

11. The method of claim 10, wherein the data link width of the first data transfer mode FLIT corresponds to the data lines of the main band not including the redundant data lines.

12. The method of claim 10, wherein the communicating the data comprises sending a second data transfer mode FLIT in a single data transfer through the main band.

13. The method of claim 10, further comprising:
detecting a faulty data line of the main band; and
sending an expanded data link width disable request message including a disable parameter to the module partner through the sideband to initialize the main band to the reduced data link width, wherein the reduced data link width excludes the faulty data line and reconfigures a redundant data line as a data line, the reduced data link width corresponding to less than the FLIT of the second data transfer mode.

14. The method of claim 6, wherein the sending the expanded data link width enable request message comprises sending the expanded data link width enable request message during the initializing the main band.

15. The method of claim 6, wherein the sending the expanded data link width enable request message comprises sending a receive data link width as a parameter included in the expanded data link width enable request message to identify a data link width for receive data lines and a transmit data link width to identify a data link width for transmit data lines.

16. The method of claim 6, further comprising negotiating a data transfer mode with the module partner including the expanded data link width.

17. The method of claim 16, wherein the sending the expanded data link width enable request message and the receiving the expanded data link width enable response message are performed in a MBINIT.PARAM exchange of Universal Chiplet Interconnect Express.

18. The method of claim 6, further comprising:
testing data lines of the main band; and
testing redundant data lines of the main band,
wherein the sending the expanded data link width enable request message is in response to the testing the data lines and the testing the redundant data lines.

19. The method of claim 6, further comprising storing an expanded data link width enable parameter in a configuration register in response to the receiving the expanded data link width enable response message.

20. The method of claim 6, further comprising:
sending a mode parameter configuration request message to the module partner through the sideband to initialize the main band for a first mode; and
receiving a mode parameter configuration response message from the module partner through the sideband to initialize the main band for the first mode,
wherein sending the expanded data link width enable request message is in response to the receiving the mode parameter configuration response message.

21. The method of claim 20, wherein the sending the mode parameter configuration request message comprises sending the mode parameter configuration request message during a main band initialization.

22. The method of claim 20, further comprising before the sending the mode parameter configuration request message:
sending a data link width support parameter configuration request message to the module partner through the sideband to indicate that the module supports an expanded data link width; and
receiving a data link width support parameter configuration response message through the sideband to indicate that the module partner supports the expanded data link width.

23. The method of claim 22, further comprising storing a data link width support parameter in a configuration register.

24. A non-transitory computer-readable medium having instructions stored therein for causing a processor of a die to perform operations comprising:
initializing a sideband of a die-to-die connection between a module and a module partner, the sideband having a receive data line and a transmit data line, wherein the sideband has a high reliability low data rate as compared to a main band of the die-to-die connection, wherein the main band comprises a plurality of data lines and a plurality of redundant data lines, wherein each redundant data line of the plurality of redundant data lines is configured to replace a failed data line of the plurality of data lines in response to a failure of the failed data line;

sending a sideband initialization done message through the transmit line of the sideband;

initializing the main band in response to the initialization done message;

sending an expanded data link width enable request message including an enable parameter to the module partner through the transmit line of the sideband to set an expanded data link width of the main band, wherein the expanded data link width includes the data lines of the plurality of data lines and at least one redundant data line of the plurality of redundant data lines;

receiving an expanded data link width enable response message including the enable parameter from the module partner through the receive line of the sideband to set the expanded data link width of the main band;

storing the enable parameter in a configuration register of the module in response to the receiving the expanded data link width enable response message;

initializing the at least one redundant data lines as a main band line in response to receiving the expanded data link width enable response message;

training the main band using the expanded data link width; and communicating data with the module partner through the main band using the expanded data link width.

25. The medium of claim 24, the operations further comprising:

sending a mode parameter configuration request message to the module partner through the sideband to initialize the main band for a first mode; and receiving a mode parameter configuration response message from the module partner through the sideband to initialize the main band for the first mode, wherein sending the expanded data link width enable request message is in response to the receiving the mode parameter configuration response message.

* * * * *